(12) United States Patent
Mitsui et al.

(10) Patent No.: US 6,521,735 B2
(45) Date of Patent: Feb. 18, 2003

(54) PRODUCTION PROCESS OF POLYPHENYLENE ETHER

(75) Inventors: Akira Mitsui, Chiba (JP); Yuji Takeda, Mie (JP)

(73) Assignees: Asahi Kasei Kabushiki Kaisha, Osaka (JP); Mitsubishi Gas Chemical Company, Inc., Tokyo (JP)

( * ) Notice: Subject to any disclaimer, the term of this patent is extended or adjusted under 35 U.S.C. 154(b) by 36 days.

(21) Appl. No.: 09/883,264

(22) Filed: Jun. 19, 2001

(65) Prior Publication Data

US 2002/0013446 A1 Jan. 31, 2002

(30) Foreign Application Priority Data

Jun. 19, 2000 (JP) .................................... 2000-183144

(51) Int. Cl.[7] .......................... C08G 65/38; C08G 65/44
(52) U.S. Cl. ...................... 528/215; 528/217; 528/490; 528/492; 528/482; 502/165
(58) Field of Search ................................. 528/215, 217, 528/490, 492, 482; 502/165

(56) References Cited

U.S. PATENT DOCUMENTS

| | | | |
|---|---|---|---|
| 4,092,294 A | | 5/1978 | Bennett, Jr. et al. |
| 4,477,651 A | | 10/1984 | White et al. |
| 4,503,214 A | * | 3/1985 | White et al. ................ 528/212 |
| 4,734,485 A | * | 3/1988 | Bartmann et al. .......... 528/216 |
| 4,788,277 A | | 11/1988 | Ibe et al. |

* cited by examiner

*Primary Examiner*—Duc Truong
(74) *Attorney, Agent, or Firm*—Birch, Stewart, Kolasch & Birch, LLP

(57) ABSTRACT

A process for producing a polyphenylene ether by oxidative polymerization of a phenol compound using a catalyst and an oxygen-containing gas, wherein said catalyst comprises a copper compound, a bromine compound, a diamine compound of formula (1) as recited in the specification, a tertiary monoamine compound and a secondary monoamine compound, and wherein said process comprises the steps of: preparing a catalyst component (P1) in a container which is under a substantially oxygen-free inert atmosphere by mixing the copper compound and the bromine compound to obtain a mixture and then mixing the mixture with the secondary monoamine compound in an amount of at least 2 times the molar amount of the copper atom; separately preparing a catalyst component (P2) by mixing the diamine compound of formula (1) and the tertiary monoamine compound together with a solvent in an oxidative polymerization vessel; adding a predetermined amount of the catalyst component (P1) to the polymerization vessel containing the catalyst component (P2), and mixing the catalyst components (P1) and (P2); and initiating oxidative polymerization.

10 Claims, No Drawings

PRODUCTION PROCESS OF POLYPHENYLENE ETHER

FIELD OF THE INVENTION

The invention relates to a production process of a polyphenylene ether improved by highly efficient preparation of a catalyst.

BACKGROUND OF THE INVENTION

As a polymerization catalyst employed upon production of a polyphenylene ether by oxidative polymerization of a phenol compound, a number of proposals have been made on the combined use of a copper compound and an amine since being proposed by JP-B-36-18692 (The term "JP-B" used herein means an "examined Japanese patent publication"). These proposals differ in, for example, the kind of the copper compound employed, the kind of a halide which works in cooperation therewith, or the kind of the amine employed whether it is a primary amine, secondary amine or tertiary amine, or whether it is a monoamine, diamine or polyamine.

In U.S. Pat. Nos. 3,306,875, 3,344,116 and 3,432,466 which is not a recent patent example, proposed is a process using a catalyst system composed of a copper compound and a tetraalkyl type diamine such as N,N,N',N'-tetramethyl-1,4-butanediamine, while in JP-B-52-17075 or JP-B-52-17076, proposed is the combination of a copper compound, a tetraalkyl type diamine and an iodine compound.

In U.S. Pat. Nos. 4,028,341 and 4,092,294, proposed is a process using a combination of a copper compound, a bromine compound, a diamine compound such as N,N'-di-t-butylethylenediamine and a tertiary amine compound such as n-butyldimethylamine, or using a combination of a copper compound, a bromine compound, the above-described diamine and tertiary amine compounds and a secondary monoamine such as N-di-n-butylamine. Moreover, U.S. Pat. No. 4,788,277 discloses a production process in the presence of a highly active catalyst having improved water resistance which is composed of a copper compound; a secondary aliphatic amine or a secondary aliphatic amine and an aniline having a special structure; N,N,N',N'-tetramethyl-1,3-diamino-(substituted or unsubstituted)-propane; and a bromine or chlorine compound.

In particular, the catalyst system as described in U.S. Pat. No. 4,092,294 has the merit of a relatively good activity in the batch-wise polymerization process, which however does not apply to the continuous production process. An improved process, in the continuous production, using the catalyst as described in the above-described patent publication is disclosed in U.S. Pat. No. 4,477,650 but it requires a special reaction vessel during the latter half of polymerization.

The above-described catalysts which permit oxidative polymerization of a phenol compound, thereby producing a polyphenylene ether, are usually composed of not a single component but various compounds. Such a catalyst system is accompanied with a serious problem that no attention has so far been paid on the preparation technique of such a complex catalyst. For example, in a batch-wise system polymerizer, such a catalyst system induces variations in activity among batches, which is undesirable from the viewpoint of production of a polyphenylene ether having stable quality. In the continuous production, these variations in activity are less than that in the batch-wise production, but undesirable scale (scale deposits) happens to appear in a reactor for a long period of time. Deposition of scale is fatal to the production of a polyphenylene ether, which is presumed to be a reason why batch-wise production is most prevalent now as a production process of a polyphenylene ether.

SUMMARY OF THE INVENTION

The present invention has been made to solve the above-described problems in the background arts.

Accordingly, an object of the present invention is to provide a production process of a polyphenylene ether which has improved productivity and is efficient in catalyst preparation.

Other objects and effects of the present invention will become apparent from the following description.

The present inventors carried out an extensive investigation on the means for overcoming the above-described problem of the conventional batch-wise polymerization process. As a result, it was surprisingly found that the performance of a catalyst largely depends on its preparation process, leading to the completion of the invention.

That is, the above-described objects of the present invention have been achieved by providing the following production processes of a polyphenylene ether.

1) A process for producing a polyphenylene ether by oxidative polymerization of a phenol compound using a catalyst and an oxygen-containing gas, wherein said catalyst comprises a copper compound, a bromine compound, a diamine compound represented by the following formula (1):

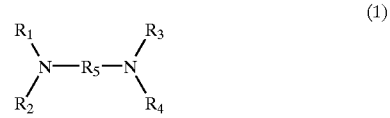

(wherein $R_1$, $R_2$, $R_3$ and $R_4$ each independently represents hydrogen or a $C_{1-6}$ linear or branched alkyl group, with the proviso that all of them do not represent hydrogen simultaneously, and $R_5$ represents a linear or methyl-branched $C_{2-5}$ alkylene group), a tertiary monoamine compound and a secondary monoamine compound, and wherein said process comprises the steps of:
preparing a catalyst component (P1) (hereinafter which may be called simply "component (P1)") in a container which is under a substantially oxygen-free inert atmosphere by mixing the copper compound and the bromine compound to obtain a mixture and then mixing the mixture with the secondary monoamine compound in an amount of at least 2 times the molar amount of the copper atom;

separately preparing a catalyst component (P2) (hereinafter which may be called simply "component (P2)") by mixing the diamine compound of formula (1) and the tertiary monoamine compound together with a solvent in an oxidative polymerization vessel;

adding a predetermined amount of the catalyst component (P1) to the polymerization vessel containing the catalyst component (P2), and mixing the catalyst components (P1) and (P2); and initiating oxidative polymerization.

2) The process according to item 1) above, wherein the catalyst component (P2) is prepared in an inert atmosphere.

3) The process according to item 1) above, wherein the catalyst component (P1) is prepared and stored at a temperature of from 10° C. to 100° C.

4) The process according to any one of items 1) to 3) above, further comprising adding a tertiary monoamine to the catalyst component (P1) in a substantially oxygen-free inert atmosphere.

5) The process according to any one of items 1) to 4) above, further comprising adding a tetraalkylammonium salt to the catalyst component (P2).

6) The process according to any one of items 1) to 5) above, wherein the copper compound is cuprous oxide, and the bromine compound is hydrogen bromide or an aqueous solution thereof.

7) The process according to any one of items 1) to 6) above, wherein the initiation of the oxidative polymerization is effected by gradually adding the phenol compound to the polymerization vessel containing the mixed catalyst components (P1) and (P2) while feeding thereto an oxygen-containing gas.

8) The process according to any one of items 1) to 6) above, wherein the initiation of the oxidative polymerization is effected by adding a portion of the phenol compound to the polymerization vessel containing the catalyst component (P2); adding a predetermined amount of the catalyst component (P1) to the resulting mixture and mixing; and gradually adding the remaining portion of the phenol compound to the polymerization vessel while feeding thereto an oxygen-containing gas.

9) The process according to any one of items 1) to 6) above, wherein the initiation of the oxidative polymerization is effected by adding the phenol compound to the polymerization vessel containing the mixed catalyst components (P1) and (P2) and then feeding thereto an oxygen-containing gas.

10) The process according to any one of items 1) to 6) above, wherein the initiation of the oxidative polymerization is effected by adding the phenol compound to the polymerization vessel containing the catalyst component (P2); adding a predetermined amount of the catalyst component (P1) to the resulting mixture and mixing; and then feeding thereto an oxygen-containing gas.

As described in items 2) to 6), the following embodiments are preferred in the present invention.

It is preferred to prepare the component (P2) also in an inert atmosphere and to prepare and store the component (P1) at a temperature of from 10° C. to 100° C. Moreover, it is preferred to add a tertiary monoamine compound to the component (P1) in a substantially oxygen-free inert atmosphere, and to add a tetraalkylammonium salt to the component (P2). Use of cuprous oxide as the copper compound and hydrogen bromide or an aqueous solution thereof as the bromine compound brings about marked advantages in the invention.

DETAILED DESCRIPTION OF THE PRESENT INVENTION

The invention is described in more detail below.

The phenol compound to be used in the invention is a compound having a structure represented by the following formula (2):

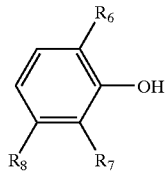

(wherein, $R_6$ represents an alkyl, substituted alkyl, aralkyl, substituted aralkyl, aryl, substituted aryl, alkoxy or substituted alkoxy group, $R_7$ represents, in addition to those described for $R_6$, a halogen atom, and $R_8$ represents, in addition to those described for $R_7$, hydrogen).

Examples of such a compound include 2,6-dimethylphenol, 2,3,6-trimethylphenol, 2-methyl-6-ethylphenol, 2,6-diethylphenol, 2-ethyl-6-n-propylphenol, 2-methyl-6-chlorophenol, 2-methyl-6-bromophenol, 2-methyl-6-isopropylphenol, 2-methyl-6-n-propylphenol, 2-ethyl-6-bromophenol, 2-methyl-6-n-butylphenol, 2,6-di-n-propylphenol, 2-ethyl-6-chlorophenol, 2-methyl-6-phenylphenol, 2,6-diphenylphenol, 2,6-bis-(4-fluorophenyl)phenol, 2-methyl-6-tolylphenol and 2,6-ditolylphenol. They may be used either singly or in combination. Incorporation of a small amount of phenol, o-cresol, m-cresol, p-cresol, 2,4-dimethylphenol or 2-ethylphenol in the above-described compound does not cause any substantial problem. Among these phenol compounds, 2,6-dimethylphenol is particularly industrially important.

The catalyst of the invention is composed of a copper compound, a bromine compound, a diamine compound having a specific structure, a tertiary monoamine compound and a secondary monoamine compound. In the invention, a process for preparing each of these components constituting the catalyst is important. First, the catalyst component (P1) is prepared by mixing a copper compound and a bromine compound in a container which is under a substantially oxygen-free inert atmosphere, and mixing the resulting mixture with a secondary monoamine compound in an amount at least 2 times the molar amount of the copper atom. Separately, the catalyst component (P2) is prepared by mixing a diamine compound having a specific structure and a tertiary monoamine compound together with a solvent in an oxidative polymerization vessel. After the addition of a predetermined amount of the component (P1) to the oxidative polymerization vessel having the component (P2) therein and mixing them, oxidative polymerization is initiated. It is important to go through these procedures. Good results are achievable when oxidative polymerization is initiated and carried out according to any one of the following processes: a process of adding a predetermined amount of the component (P1) to an oxidative polymerization vessel having the component (P2) therein, mixing them and adding the phenol compound in portions to the polymerization vessel while feeding thereto an oxygen-containing gas, thereby carrying out oxidative polymerization; a process of adding a portion of the phenol compound to an oxidative polymerization vessel having the component (P2) therein, adding to the phenol compound a predetermined amount of the component (P1), mixing them, and adding the remaining portion of the phenol compound in portions to the polymerization vessel while feeding thereto an oxygen-containing gas, thereby carrying out oxidative polymerization; a process of adding a predetermined amount of the component (P1) to an oxidative polymerization vessel having the component (P2) therein, adding the whole portion of the phenol compound to the resulting mixture and carrying out oxidative polymerization while feeding the reaction vessel with an oxygen-containing gas; and a process of adding the whole portion of the phenol compound to an oxidative polymerization vessel having the component (P2) therein, adding thereto a predetermined amount of the component (P1), mixing them and then carrying out oxidative polymerization while feeding the polymerization vessel with an oxygen-containing gas. These methods are similar in that an oxygen-containing gas is fed after the addition of the component (P1).

The term "a substantially-oxygen free inert atmosphere" as used herein means an atmosphere which does not substantially induce oxidative polymerization even if the phenol compound is introduced. This atmosphere is prepared by causing an inert gas to flow in a reactor. No particular limitation is imposed on the kind of the inert gas insofar as it does not seriously disturb the activity of this catalyst system. As an inert gas, nitrogen is preferred.

In the invention, the below-described compounds are usable as the copper compound or bromine compound. As the copper compound, cuprous compounds are preferred. Examples of the cuprous compound include cuprous oxide, cuprous chloride, cuprous bromide, cuprous sulfate and cuprous nitrate. They may be used either singly or in combination. Examples of the bromine compound include hydrogen bromide, sodium bromide, potassium bromide, tetramethylammonium bromide and tetraethylammonium bromide. These compounds may be used as an aqueous solution or a solution in a suitable solvent. These bromine compounds may be used singly or in combination.

Upon preparation of the catalyst component (P1) in the invention, first, a copper compound and a bromine compound as exemplified above are mixed in a vessel under a substantially oxygen-free inert atmosphere. The preferred combination of the copper compound and the bromine compound is that of cuprous oxide and an aqueous solution of hydrogen bromide. Although no particular limitation is imposed on the amount of them, the amount of the bromine compound in terms of a bromine atom is at least 2 times the molar amount but not greater than 10 times the molar amount of the copper atom, while the amount of the copper compound in terms of a copper atom falls within a range of 0.02 to 0.6 mole based on 100 moles of the phenol compound.

Then, the catalyst component (P1) is prepared by mixing the resulting mixture with a secondary monoamine compound in an amount of at least 2 times the molar amount of a copper atom in a container which is under a substantially oxygen-free inert atmosphere. Examples of the secondary monoamine compound include dimethylamine, diethylamine, di-n-propylamine, di-i-propylamine, di-n-butylamine, di-i-butylamine, di-t-butylamine, dipentylamines, dihexylamines, dioctylamines, didecylamines, dibenzylamines, methylethylamine, methylpropylamine, methylbutylamine and cyclohexylamine. Examples of the N-(substituted or unsubstituted phenyl)alkanolamine include, but are not limited thereto, N-phenylmethanolamine, N-phenylethanolamine, N-phenylpropanolamine, N-(m-methylphenyl) ethanolamine, N-(p-methylphenyl)ethanolamine, N-(2',6'-dimethylphenyl)ethanolamine and N-(p-chlorophenyl) ethanolamine. Examples of the N-(hydrocarbon-substituted) aniline include N-ethylaniline, N-butylaniline, N-methyl-2-methylaniline, N-methyl-2,6-dimethylaniline and diphenylamine. These secondary monoamine compounds may be used either singly or in combination. Although no particular limitation is imposed on the amount, it is usually added in an amount ranging from 0.05 to 15 moles based on 100 moles of the phenol compound. Upon preparation of the component (P1), the whole of the above-described amount of the secondary monoamine compound can be used, but it is necessary to use it in at least an amount of 2 times or greater of the molar amount of the copper atom contained in the component (P1). Omission of the secondary monoamine compound from the component (P1) is not desired, because it causes large variations in activity among batches. When only a portion of the secondary monoamine compound is used as the component (P1), the remaining portion may be added to the component (P2) or added together with the phenol compound (a solution thereof) to be added after feeding of an oxidizing gas is initiated. As the secondary monoamine, di-n-butylamine is preferred.

By the above-described operation, the component (P1) can be prepared. It is possible to add a portion of the solvent to be used upon polymerization insofar as it does not disturb the advantages of the invention. Examples of usable solvents will be described later.

The component (P1) is prepared at a temperature ranging from 10 to 100° C. At a temperature less than the above-described range, partial precipitation occurs, which disturbs the stoichiometric balance or causes troubles such as the formation of scale. Temperatures exceeding the above-described range cause slight lowering in the catalytic activity. When several batches of the component (P1) must be prepared in advance, it is recommended to store the component (P1) within the above-described temperature range.

To the component (P1), a portion of a tertiary monoamine can be added further. Examples of the tertiary monoamine compound will be described later.

As another preparation step in the invention, the catalyst component (P2) is prepared by mixing a diamine compound and a tertiary monoamine compound, together with a solvent, in an oxidative polymerization vessel. To the component (P2), a portion of the above-exemplified secondary monoamine compound can be added. The preparation of the component (P2) may be conducted in an oxidative polymerization vessel; or in a suitable container, followed by transfer, upon preparation of the polyphenylene ether, to another reaction vessel permitting oxidative polymerization. Preparation of the component (P2) in an inert atmosphere, like the component (P1), brings about good results.

The diamine compound to be used in the invention has a structure represented by the following formula (1):

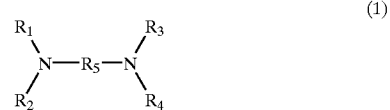

(wherein, $R_1$, $R_2$, $R_3$ and $R_4$ each independently represents hydrogen or a $C_{1-6}$ linear or branched alkyl group, with the proviso that they do not represent a hydrogen atom at the same time, and $R_5$ represents a $C_{2-5}$ linear or methyl-branched alkylene group).

Although no particular limitation is imposed on the amount of the diamine compound having the above-described structure, it is preferably added in an amount of at least 0.5 time the moles of copper atom to be used. The upper limit is not critical. Among the diamine compounds, preferred is N,N'-di-t-butylethylenediamine.

As the tertiary monoamine compound, aliphatic tertiary amines including alicyclic tertiary amines can be used. Examples include trimethylamine, triethylamine, tripropylamine, tributylamine, triisobutylamine, dimethylethylamine, dimethylpropylamine, allyldiethylamine, dimethyl-n-butylamine, diethylisopropylamine and N-methylcyclohexylamine. These tertiary monoamines may be used either singly or in combination. Although no particular limitation is imposed on the amount of tertiary monoamine compound, an amount ranging from 0.1 to 15 moles relative to 100 moles of the phenol compound is preferred.

It is not necessary to add, to the component (P2), the whole amount of the tertiary monoamine compound to be usually added. A portion of it may be added to the component (P1), or may be added to the phenol compound (or a solution thereof) which is added upon the initiation of the polymerization.

In the invention, incorporation of a tetraalkylammonium salt compound to the component (P2) is preferred for making the action of the invention more effective.

The tetraalkylammonium salt compound has a structure represented by the following formula (3):

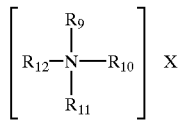

(3)

(wherein, $R_9$, $R_{10}$, $R_{11}$ and $R_{12}$ each independently represents a $C_{1-22}$ linear or branched alkyl group and X is a counter anion).

The typical example of such a compound is trioctylmethylammonium chloride known as a trade name of Aliquat 336 (product of Henkel KGaA) or Capriquat (product of Dojindo Laboratories). It is preferably added in an amount within a range not exceeding 0.1 wt. % based on the whole amount of the reaction mixture including the phenol compound.

To the component (P2), a portion of a solvent for oxidative polymerization is added. Although there is no particular limitation imposed on the nature of the solvent insofar as it is not easily oxidized compared with the monomer which is a substance to be oxidized and at the same time, has almost no reactivity with various radicals which are presumed to be formed during reaction, those permitting dissolution therein of a low-molecular-weight phenol compound and also a portion or whole of the catalyst mixture are preferred. Examples of such a solvent include aromatic hydrocarbons such as benzene, toluene, xylene and ethylbenzene, hydrocarbon halides such as chloroform, methylene chloride, 1,2-dichloroethane, trichloroethane, chlorobenzene, dichlorobenzene and trichlorobenzene; and nitro compounds such as nitrobenzene. They may be used as a good solvent for a polymer. Examples further include alcohols such as methanol, ethanol, propanol, butanol, benzyl alcohol and cyclohexanol, aliphatic hydrocarbons such as pentane, hexane, heptane, cyclohexane and cycloheptane, ketones such as acetone and methyl ethyl ketone, esters such as ethyl acetate and ethyl formate, ethers such as tetrahydrofuran and diethyl ether, amides such as dimethylformamide, sulfoxides such as dimethyl sulfoxide and water. These solvents may be used either singly or in combination.

As a solvent, the single use of an aromatic hydrocarbon such as toluene or xylene is frequently adopted. Sometimes, a small amount of an alcohol such as methanol or ethanol is mixed therewith.

For the component (P1), such a solvent is usable, but not always necessary. The phenol compound to be added over a predetermined time from the beginning of polymerization can be added in the dissolved form in such a solvent. It is the common practice to adjust the concentration of the phenol compound to 20 to 80% in the resulting solution. As described above, it is possible to add a portion of the secondary monoamine compound or a portion of the tertiary monoamine compound to the phenol compound or a solution thereof.

The polymerization method becomes a solution polymerization at a specific ratio of good solvent to poor solvent for a polyphenylene ether which is a polymer available by oxidative polymerization of a phenol compound. At an increased ratio of a poor solvent, on the other hand, the method becomes a precipitation polymerization wherein the polymer is precipitated as particles in the reaction solvent with the progress of the reaction. The invention exhibits marked effects in the batch-wise polymerization in the solution polymerization. Particularly in the below-described processes (1) to (IV), the advantages of the invention are marked.

(1) a process of adding a predetermined amount of the component (P1) to an oxidative polymerization vessel having the component (P2) therein, mixing them and adding the phenol compound in portions to the polymerization vessel while feeding thereto an oxygen-containing gas, thereby carrying out oxidative polymerization;

(II) a process of adding a portion of the phenol compound to an oxidative polymerization vessel having the component (P2) therein, adding to the phenol compound a predetermined amount of the component (P1), mixing them, and gradually adding the remaining portion of the phenol compound to the polymerization vessel while feeding thereto an oxygen-containing gas, thereby carrying out oxidative polymerization;

(III) a process of adding a predetermined amount of the component (P1) to an oxidative polymerization vessel having the component (P2) therein, adding the whole amount of the phenol compound to the resulting mixture and carrying out oxidative polymerization while feeding the polymerization vessel with an oxygen-containing gas; and (IV) a process of adding the whole amount of the phenol compound to an oxidative polymerization vessel having the component (P2) therein, adding a predetermined amount of the component (P1), mixing them and then carrying out oxidative polymerization while feeding the polymerization vessel with an oxygen-containing gas.

To the polymerization system, a hydroxide of an alkali metal, hydroxide of an alkaline earth metal, alkoxide of an alkali metal, neutral salt such as magnesium sulfate or calcium chloride or zeolite can also be added.

Polymerization is preferably effected at a temperature ranging from 0 to 80° C., more preferably 10 to 70° C., because reaction does not proceed smoothly at an excessively low temperature, while the catalyst happens to be deactivated at an excessively high temperature.

As the oxygen-containing gas to be used upon oxidative polymerization of the invention, not only pure oxygen but also a mixture with an inert gas such as nitrogen at any ratio or air can be used. As the pressure in the system during reaction, normal pressure is sufficient, but reaction may be effected under reduced pressure or under pressure as needed.

No particular limitation is imposed on the treatment after completion of the polymerization reaction. A polyphenylene ether can usually be collected simply by adding an acid such as hydrochloric acid or acetic acid, ethylenediaminetetraacetic acid (EDTA) or a salt thereof, or nitrilotriacetic acid or a salt thereof to the reaction mixture to deactivate the catalyst, separating the resulting polymer from the reaction mixture, washing it with a solvent such as methanol which does not dissolve therein the polymer and then drying.

EXAMPLES

The invention will hereinafter be described more specifically by examples wherein 2,6-dimethylphenol was used as the phenol compound; and with regards to the catalyst component, cuprous oxide was used as the copper compound, hydrogen bromide (in the form of an aqueous solution) as the bromine compound, N,N'-di-t-butylethylenediamine (which will hereinafter be abbreviated as "Dt") as the diamine compound, N,N-di-n-butylamine (which will hereinafter be abbreviated as "DBA") as the secondary monoamine compound, N,N-dimethyl-n-butylamine (which will hereinafter be abbreviated as "BD") as the tertiary monoamine, trioctylmethylammonium chloride (which will hereinafter be abbreviated as "TOM") as the tetraalkylammonium salt; and air as the oxygen containing gas. It should however be borne in mind that the invention is not limited to or by these examples.

The viscosity ($\eta sp/c$) of a polyphenylene ether was measured at 30° C. as a chloroform solution having a concentration of 0.5 g/100 ml by using an Ubbelohde's viscometer. The unit is dl/g.

Procedures generally employed in each of the examples and comparative examples will next be described.

In a 10 liter jacketed glass-made reactor having, at its bottom, a sparger for introducing an oxygen-containing gas (air), an agitating turbine element and a baffle; and having, at a vent gas line at the upper portion of the reactor, a reflux condenser having a Dean Stark trap attached to the bottom, the catalyst components and a portion of toluene are charged in accordance with the method as described in each of the examples and comparative examples. Vigorous stirring is started, followed by introduction of the air from a sparger. The gaseous phase is purged with nitrogen for safety. Addition of a solution of 2,6-dimethylphenol in toluene is started at such a rate as to complete addition of its whole amount in the reactor over 30 minutes. This point when the addition of the monomer solution is started is designated as the polymerization initiation time except for Examples 23 and 24 and Comparative Example 4. In Example 23 and Comparative Example 4, the point when the addition of the remaining monomer solution is started is designated as the polymerization initiation time. In Example 24, the point when the aeration is started is designated as the polymerization initiation time. The amount of each component is based on the calculated amount (charged amount) of the whole charged mixture at the time when the addition of the 2,6-dimethylphenol solution is completed. In order to describe the examples of the present invention while comparing them, charged amounts are common in the below-described examples and comparative examples. Added are 1100 g of 2,6-dimethylphenol, 3827.2 g of toluene, 1.4172 g of cuprous oxide, a 47% aqueous solution of 8.5243 g of hydrogen bromide, 3.4139 g of Dt, 41.9196 g of BD, 16.5277 g of DBA and if necessary, 1.00 g of TOM. In Example 22, however, another copper compound is used for studying the influence caused by the use of a different copper compound. At any time during polymerization, a small amount of the reaction mixture is sampled. An aqueous solution of tetrasodium salt of EDTA is added thereto, followed by stirring. By the addition of an equal volume of methanol, a polymer is precipitated. The polymer thus precipitated is filtered and the filtrate is washed three times with methanol and then dried under vacuum at 145° C. for 1 hour. The $\eta sp/c$ of the dried polymer is measured. From the curve of $\eta sp/c$ relative to the polymerization time, the time necessary for attaining a desired $\eta sp/c$ from the initiation of polymerization is found and it is determined as a necessary time. The desired $\eta sp/c$ is set at 0.75 dl/g.

Example 1

In 1056.86 g of toluene, 1100 g of 2,6-dimethylphenol was dissolved. This solution was hereinafter called a monomer solution. In a Teflon-made flask, 1.4172 g of cuprous oxide was weighed. While purging with nitrogen, 8.5243 g of a 47% aqueous solution of hydrogen bromide was mixed under stirring with a stirrer. The resulting mixture was mixed further with 16.5277 g of DBA. The mixture thus obtained was hereinafter called (P1). Separately, in a polymerization vessel purged with nitrogen, 3.4139 g of Dt, 41.9196 g of Bd, 1.00 g of TOM and 2770.335 g of toluene were charged. This mixture was hereinafter called (P2). While continuing purging with nitrogen, the whole amount of (P1) was added to the polymerization vessel. Nitrogen purging was then terminated and, while stirring vigorously, air was introduced at a rate of 7.6 Nl/min from the bottom of the polymerization vessel. Addition of the monomer solution was started using a plunger type pump at such a rate to complete charging of its whole amount over 30 minutes. The polymerization temperature was kept at 40° C. by feeding a heat transfer medium to a jacket. After the polymer solution started to be viscous, sampling of it in a small amount was started. The necessary time (that is, polymerization time necessary for $\eta sp/c$ to reach 0.75 dl/g from the initiation of the polymerization) was determined by measuring $\eta sp/c$. The results of the necessary time are shown in Table 1.

Example 2

In a similar manner to Example 1 except that the amount of BD added to the component (P2) was changed to 31.5013 g and the remaining 10.4183 g was added to the monomer solution, polymerization and measurement were conducted. The results of the necessary time are shown in Table 1.

Example 3

In a similar manner to Example 1 except that the amount of BD added to the component (P2) was changed to 31.5013 g and the remaining 10.4183 g was added to the component (P1), polymerization and measurement were conducted. The results of the necessary time are shown in Table 1.

Example 4

In a similar manner to Example 1 except that the amounts of BD added to the component (P1), the component (P2) and the monomer solution were changed to 4.1920 g, 27.3093 g and 10.4183 g, respectively, polymerization and measurement were conducted. The results of the necessary time are shown in Table 1.

Comparative Example 1

In a similar manner to Example 1 except that cuprous oxide, an aqueous solution of hydrogen bromide, DBA, Dt, BD, TOM and toluene were added to the polymerization vessel (all the components were mixed in the same polymerization vessel), polymerization and measurement were conducted. The results of the necessary time are shown in Table 1.

Comparative Example 2

In a similar manner to Example 1 except that Dt was not added to the component (P2) but added to the component (P1) in an amount of 3.4139 g, polymerization was conducted. At this time, precipitation appeared in the component (P1) in the polymerization vessel so that scraping of the precipitate became necessary. The results of the necessary time are shown in Table 1.

Example 5

In a similar manner to Example 1 except that the amount of toluene added to the component (P2) was reduced to 2700 g and the remaining 70.335 g was added to the component (P1), polymerization and measurement were conducted. The results of the necessary time are shown in Table 1.

Example 6

In a similar manner to Example 2 except that the amount of toluene added to the component (P2) was reduced to 2700 g and the remaining 70.335 g was added to the component (P1), polymerization and measurement were conducted. The results of the necessary time are shown in Table 1.

Example 7

In a similar manner to Example 3 except that the amount of toluene added to the component (P2) was reduced to 2700 g and the remaining 70.335 g was added to the component (P1), polymerization and measurement were conducted. The results of the necessary time are shown in Table 1.

Example 8

In a similar manner to Example 4 except that the amount of toluene added to the component (P2) was reduced to 2700 g and the remaining 70.335 g was added to the component (P1), polymerization and measurement were conducted. The results of the necessary time are shown in Table 1.

Example 9

In a similar manner to Example 5 except for the omission of TOM, polymerization and measurement were conducted. The results of the necessary time are shown in Table 1.

Example 10

In a similar manner to Example 6 except for the omission of Tom, polymerization and measurement were conducted. The results of the necessary time are shown in Table 1.

Example 11

In a similar manner to Example 7 except for the omission of Tom, polymerization and measurement were conducted. The results of the necessary time are shown in Table 1.

Example 12

In a similar manner to Example 8 except for the omission of Tom, polymerization and measurement were conducted. The results of the necessary time are shown in Table 1.

Example 13

In a similar manner to Example 8 except that the amount of DBA added to the component (P1) was reduced to 9.3051 g and the remaining 7.2226 g of DBA was added to the component (P2), polymerization and measurement were conducted. The results of the necessary time are shown in Table 1.

Example 14

In a similar manner to Example 13 except that the amount of DBA added to the component (P2) was reduced to 5.1236 g and the remaining 2.099 g of DBA was added to the monomer solution, polymerization and measurement were conducted. The results of the necessary time are shown in Table 1.

Example 15

In a similar manner to Example 14 except that the amount of DBA added to the component (P1) was reduced to 5.3764 g (that is, DBA was added to the component (P1) in an amount 2.1 times the molar amount of copper atom) and the amount of DBA added to the component (P2) was raised to 9.0523 g (that is, DBA was added to the component (P2) in an amount of [(9.3051−5.3764)+5.1236] g), polymerization and measurement were conducted. The results of the necessary time are shown in Table 1.

Comparative Example 3

In a similar manner to Example 14 except that the amount of DBA added to the component (P1) was reduced to 4.6084 g (that is, DBA was added to the component (P1) in an amount of 1.8 times the molar amount of the copper atom) and the amount of DBA added to the component (P2) was raised to 9.8203 g (that is, DBA was added to the component (P2) in an amount of [(9.3051−4.6084)+5.1236] g), polymerization and measurement were conducted. The results of the necessary time are shown in Table 1.

Example 16

In a similar manner to Example 14 except that the component (P1) was used after storage at 5° C. for 24 hours after preparation, polymerization and measurement were conducted. The results of the necessary time are shown in Table 1.

Example 17

In a similar manner to Example 14 except that the component (P1) was used after storage at 20° C. for 24 hours after preparation, oxidative polymerization was conducted. The results of the necessary time are shown in Table 1.

Example 18

In a similar manner to Example 14 except that the component (P1) was used after storage at 50° C. for 24 hours after preparation, polymerization and measurement were conducted. The results of the necessary time are shown in Table 1.

Example 19

In a similar manner to Example 14 except that the component (P1) was used after storage at 80° C. for 24 hours after preparation, polymerization and measurement were conducted. The results of the necessary time are shown in Table 1.

Example 20

In a similar manner to Example 14 except that the component (P1) was used after storage at 105° C. for 24 hours after preparation, polymerization and measurement were conducted. The results of the necessary time are shown in Table 1.

Example 21

In a similar manner to Example 14 except that the component (P2) was prepared in an atmosphere having an oxygen concentration of about 5%, polymerization and measurement were conducted. The results of the necessary time are shown in Table 1.

Example 22

In a similar manner to Example 4 except that 1.9606 g (the same as the molar amount of copper) of cuprous chloride was used instead of cuprous oxide, polymerization and measurement were conducted. The results of the necessary time are shown in Table 1.

Example 23

In a similar manner to Example 3 except that after addition of the component (P1) to the component (P2), 215.69 g of the monomer solution was added to the polymerization vessel and right after the starting of aeration, the remaining 1941.17 g of the monomer solution was charged at such a rate as to complete charging of it over 30 minutes, polymerization and measurement were conducted. The results of the necessary time are shown in Table 1.

Comparative Example 4

In a similar manner to Example 23 except that used as the component P1 was a mixture of cuprous oxide and an aqueous solution of hydrogen bromide (a mixture free of DBA and BD) and the amounts of DBA and BD added to the component (P1) in Example 23 were added to the component (P2) for adjusting the charged values, polymerization and measurement were conducted. The results of the necessary time are shown in Table 1.

Example 24

In a similar manner to Example 3 except that after addition of the component (P1) to the component (P2), the whole amount of the monomer solution was added to the polymerization vessel, followed by starting of aeration, polymerization and measurement were conducted. The results of the necessary time are shown in Table 1.

Example 25

In a similar manner to Example 1 except that TOM was not added to the component (P2) but added to the component (P1) in an amount of 1.00 g, polymerization and measurement were conducted. The results of the necessary time are shown in Table 1.

Example 26

Each of the test operations conducted in Examples 1 to 25 was repeated twice and reproducibility (Reproducibility 1, Reproducibility 2) of polymerization was observed. The results of the necessary time are shown in Table 1.

Comparative Example 5

Each of the test operations conducted in Comparative Examples 1 to 4 was repeated twice and reproducibility (Reproducibility 1, Reproducibility 2) of polymerization was observed. The results of the necessary time are shown in Table 1.

From Table 1, it is apparent that among Examples to which the process of the invention was applied, there is almost no difference in the necessary time, while there is a large difference in the necessary time among the Comparative Examples, wherein some need a longer time.

TABLE 1

| | Necessary time (min) | | | |
| | | Example 26 or Comp. Ex. 5 | | Average ± |
| Example No. | | Reproducibility 1 | Reproducibility 2 | 95% Confidence Interval |
|---|---|---|---|---|
| Example 1 | 143.9 | 146.1 | 145.2 | 145.07 ± 1.25 |
| Example 2 | 146.3 | 145.8 | 145.6 | 145.90 ± 0.41 |
| Example 3 | 138.3 | 140.5 | 139.7 | 139.50 ± 1.26 |
| Example 4 | 140.1 | 141.6 | 140.6 | 140.77 ± 0.86 |
| Comp. Ex. 1 | 180.6 | 170.0 | 192.4 | 181.00 ± 12.68 |
| Comp. Ex. 2 | 186.4 | 177.2 | 195.5 | 186.37 ± 10.35 |
| Example 5 | 144.9 | 146.5 | 145.0 | 145.47 ± 1.01 |
| Example 6 | 146.5 | 145.7 | 145.8 | 146.00 ± 0.49 |
| Example 7 | 139.0 | 138.5 | 139.8 | 139.10 ± 0.74 |
| Example 8 | 138.4 | 140.7 | 141.1 | 140.07 ± 1.65 |
| Example 9 | 155.6 | 155.3 | 154.8 | 155.23 ± 0.46 |
| Example 10 | 156.1 | 155.2 | 156.4 | 155.90 ± 0.71 |
| Example 11 | 154.1 | 155.0 | 153.7 | 154.27 ± 0.75 |
| Example 12 | 155.5 | 156.4 | 154.9 | 155.60 ± 0.85 |
| Example 13 | 140.2 | 141.6 | 138.5 | 140.10 ± 1.76 |
| Example 14 | 140.6 | 141.2 | 140.8 | 140.87 ± 0.35 |
| Example 15 | 143.5 | 142.8 | 143.2 | 143.17 ± 0.40 |
| Comp. Ex. 3 | 172.2 | 158.6 | 166.5 | 165.77 ± 7.73 |
| Example 16 | 143.5 | 144.2 | 142.9 | 143.53 ± 0.74 |
| Example 17 | 139.7 | 141.6 | 140.3 | 140.53 ± 1.10 |
| Example 18 | 138.8 | 140.1 | 140.8 | 139.90 ± 1.15 |
| Example 19 | 142.2 | 141.2 | 143.0 | 142.13 ± 1.02 |
| Example 20 | 145.5 | 144.3 | 146.0 | 145.27 ± 0.99 |
| Example 21 | 143.8 | 144.6 | 142.9 | 143.77 ± 0.96 |
| Example 22 | 152.0 | 150.7 | 151.6 | 151.43 ± 0.75 |
| Example 23 | 137.8 | 136.9 | 138.1 | 137.60 ± 0.71 |
| Comp. Ex. 4 | 152.9 | 170.2 | 160.3 | 161.13 ± 9.82 |
| Example 24 | 141.0 | 140.2 | 139.4 | 140.20 ± 0.91 |
| Example 25 | 168.7 | 165.9 | 167.7 | 167.43 ± 1.61 |

The production process of a polyphenylene ether, particularly in the batch-wise reaction, has improved productivity and becomes efficient by preparing the catalyst system therefor according to the present invention.

While the invention has been described in detail and with reference to specific examples thereof, it will be apparent to one skilled in the art that various changes and modifications can be made therein without departing from the spirit and scope thereof.

What is claimed is:

1. A process for producing a polyphenylene ether by oxidative polymerization of a phenol compound using a catalyst and an oxygen-containing gas, wherein said catalyst comprises a copper compound, a bromine compound, a diamine compound represented by the following formula (1):

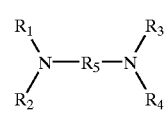

(1)

(wherein $R_1$, $R_2$, $R_3$ and $R_4$ each independently represents hydrogen or a $C_{1-6}$ linear or branched alkyl group, with the proviso that all of them do not represent hydrogen simultaneously, and $R_5$ represents a linear or methyl branched $C_{2-5}$ alkylene group), a tertiary monoamine compound and a secondary monoamine compound, and wherein said process comprises the steps of:
preparing a catalyst component (P1) in a container which is under a substantially oxygen-free inert atmosphere by mixing the copper compound and the bromine compound to obtain a mixture and then mixing the mixture with the secondary monoamine compound in an amount of at least 2 times the molar amount of the copper atom;
separately preparing a catalyst component (P2) by mixing the diamine compound of formula (1) and the tertiary monoamine compound together with a solvent in an oxidative polymerization vessel;
adding a predetermined amount of the catalyst component (P1) to the polymerization vessel containing the catalyst component (P2), and mixing the catalyst components (P1) and (P2); and
initiating oxidative polymerization.

2. The process according to claim 1, wherein the catalyst component (P2) is prepared in an inert atmosphere.

3. The process according to claim 1, wherein the catalyst component (P1) is prepared and stored at a temperature of from 10° C. to 100° C.

4. The process according to claim 1, further comprising adding a tertiary monoamine to the catalyst component (P1) in a substantially oxygen-free inert atmosphere.

5. The process according to any one of claims 1 to 4, further comprising adding a tetraalkylamonium salt to the catalyst component (P2).

6. The process according to any one of claims 1 to 4, wherein the copper compound is cuprous oxide, and the bromine compound is hydrogen bromide or an aqueous solution thereof.

7. The process according to any one of claims 1 to 4, wherein the initiation of the oxidative polymerization is effected by gradually adding the phenol compound to the polymerization vessel containing the mixed catalyst components (P1) and (P2) while feeding thereto an oxygen-containing gas.

8. The process according to any one of claims 1 to 4, wherein the initiation of the oxidative polymerization is effected by adding a portion of the phenol compound to the polymerization vessel containing the catalyst component (P2); adding a predetermined amount of the catalyst component (P1) to the resulting mixture and mixing; and gradually adding the remaining portion of the phenol compound to the polymerization vessel while feeding thereto an oxygen-containing gas.

9. The process according to any one of claims 1 to 4, wherein the initiation of the oxidative polymerization is effected by adding the phenol compound to the polymerization vessel containing the mixed catalyst components (P1) and (P2) and then feeding thereto an oxygen-containing gas.

10. The process according to any one of claims 1 to 4, wherein the initiation of the oxidative polymerization is effected by adding the phenol compound to the polymerization vessel containing the catalyst component (P2); adding a predetermined amount of the catalyst component (P1) to the resulting mixture and mixing; and then feeding thereto an oxygen-containing gas.

* * * * *